United States Patent [19]
Konerman

[11] 3,764,251
[45] Oct. 9, 1973

[54] DEVICE FOR EXTRUDING SYNTHETIC MATERIAL
[75] Inventor: Fritz Konerman, Lengerich, Germany
[73] Assignee: Bischof und Klein, Lengerich, Germany
[22] Filed: Oct. 18, 1971
[21] Appl. No.: 189,967

[30] Foreign Application Priority Data
Oct. 17, 1970 Germany................ P 20 51 041.2

[52] U.S. Cl................................ 425/326, 425/461
[51] Int. Cl............................................. B29f 3/08
[58] Field of Search................ 425/72, 326, 384, 425/387, 461

[56] References Cited
UNITED STATES PATENTS
3,074,108  1/1963  Wiley et al..................... 425/72 X
3,186,033  6/1965  Newman............................. 425/72
3,210,803  10/1965 Najar................................. 425/72

FOREIGN PATENTS OR APPLICATIONS
1,421,490  11/1965  France............................. 425/72
432,813    9/1967   Switzerland....................... 425/72

Primary Examiner—J. Spencer Overholser
Assistant Examiner—Brian P. Ross
Attorney—Arthur O. Klein

[57] ABSTRACT

A blower ring for a tube extrusion die has passage means through which secondary cooling air from the environment is induced to flow into the cooling gas stream issuing from the blower orifice thereby intensifying the rate of cooling, increasing the extrusion performance and reducing the mechanical loading of the extrusion prior to its solidification.

5 Claims, 1 Drawing Figure

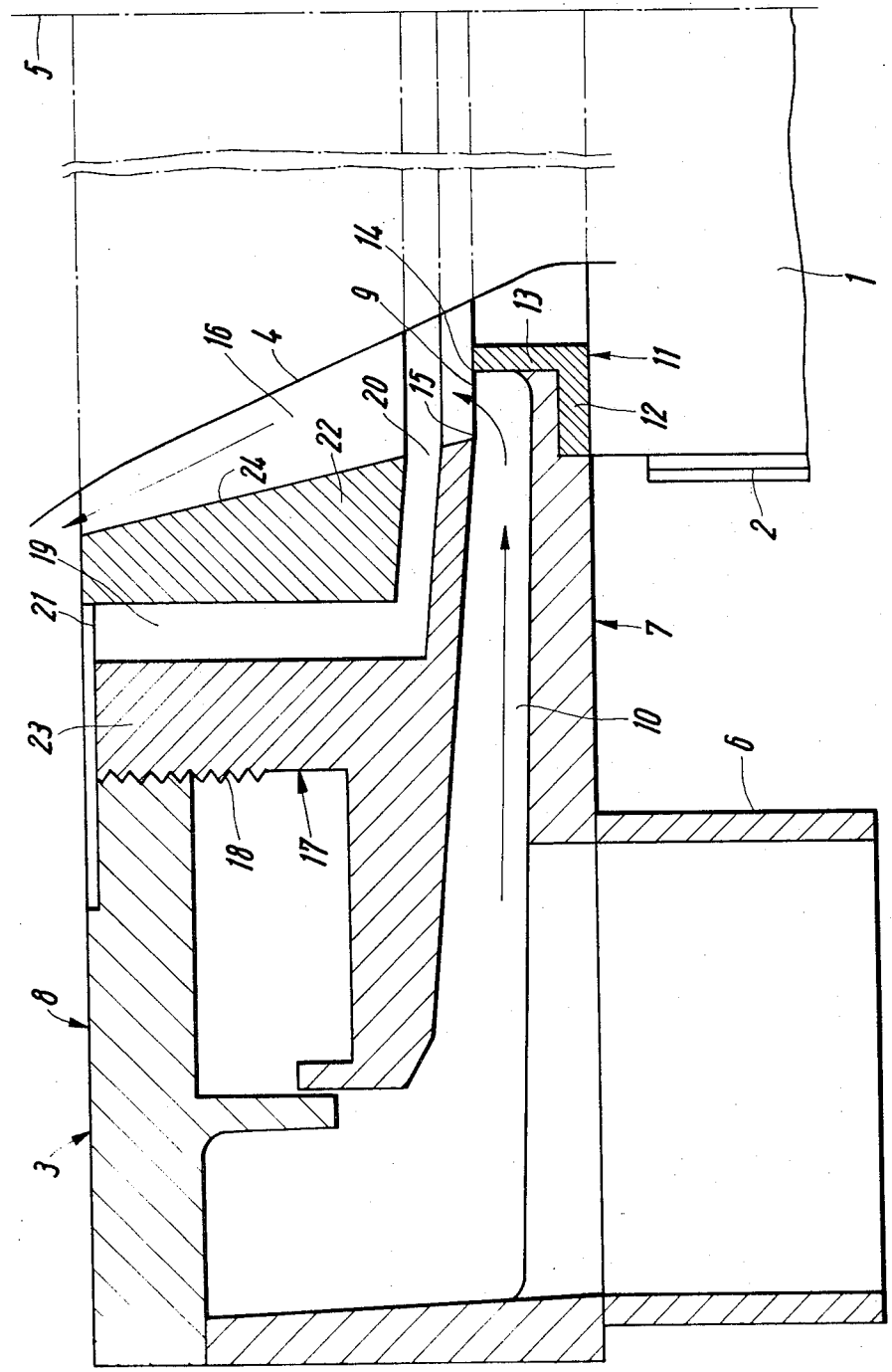

DEVICE FOR EXTRUDING SYNTHETIC MATERIAL

The present invention relates to a device for extruding synthetic material and concerns such a device comprising an extrusion die and a surrounding blower ring for blowing cooling gas supplied under pressure to the ring, onto material leaving the die, substantially in the direction of its extrusion and through an annular orifice adjoining the mouth of the die and positioned at the upstream end of a diverging passage defined by a frusto conical inner wall of the blower ring and through which the extruded material leaves the die.

The object of the present invention is to provide an improved device as just described, which, whilst using simple constructional means, ensures better cooling of the exiting material with improved extrusion performance and simultaneous reduced mechanical loading on the extrusion before it solidifies.

According to the invention the improvement comprises passage means communicating through said inner wall close to said annular orifice and through which, during use of the device, outside air from the environment can be introduced into said passage as a function of the pressure in the passage adjacent the annular orifice.

Conveniently, said passage means communicates with the outside air through an opening in the front face of the blower ring. For matching purposes, furthermore, in accordance with a feature of the invention the through flow cross-section of said passage means is adjustable. In one particularly simple constructional arrangement according to the invention the blower ring has a bottom lip and a top lip equipped with an adjuster ring, said lips defining said annular orifice between them and the top lip has two annular bodies defining said passage means between them, and the inner body is adjustable relatively to the outer body in the direction of the blower ring centre axis.

Conveniently said passage means is in the form of an annular slot.

The exterior surface of the extrustion defines with the frusto-conical inner wall of the blower ring an annular gap and secondary air is drawn in through said passage means into this annular gap automatically in use of the device, as a function of the pressure and flow conditions prevailing in the annular gap. The secondary air is mixed with the cooling gas and reinforces existing turbulence conditions and thus provides automatic pressure regulation which in turn improves heat transfer and stabilises the extrusion operation.

A specific embodiment of the invention will now be described by way of example with reference to the accompanying drawing which is a partial axial section of a device according to the invention.

Referring to the accompanying drawing, the device schematically illustrated therein consists of a tube extrusion die 1 which can have any known kind of design suitable for the extrusion of synthetic material and is equipped for example with heater elements 2. The extrusion die 1 is surrounded by a blower ring generally indicated at 3, with the help of which the tube indicated schematically at 4 and exiting in the plastic condition from the die 1, has cooling gas blown around it. This cooling gas, generally air, is supplied from a blower (not shown) to the blower ring 3 whose central axis 5 is coaxial with the die axis, through a number of connections 6, for example four or six, uniformly distributed around the circumference of the blower ring.

The blower ring 3 consists essentially of a bottom section 7, the so-called bottom lip, and a top section 8, the associated top lip. The bottom lip 7 and the top lip 8 together define flow passages 10 in each case leading to the exit plane 9 of an annular blower orifice, and which forms a venturi extending substantially radially inwardly with respect to the blower ring centre axis 5. In these flow passages 10, the cooling gas is given a very substantial acceleration in its radially inward flow, as indicated by the arrow shown in the drawing, before it is deflected, at the radially inner end of each flow passage, into a basic direction corresponding substantially with the direction of extrusion of the tube 4. This deflection is produced by an L-sectioned guide ring 11 on the bottom lip, having a radially directed leg 12 of its section, engaged beneath the internal edge of the bottom lip 7, and an axially directed leg 13 of its section projecting in the direction of extrusion. The external edge 14 of the leg 13 in association with an internal edge 15 of the top lip 8, defines an annular blower orifice, the exit plane 9 of which, in the example illustrated, is located substantially in a radial plane with respect to the centre axis 5 of the blower ring. The cooling gas, initially substantially accelerated in the flow passages 10 because of the reduction in the through flow cross-sectional area, experiences a retardation on transfer to the annular gap 16 bounded externally by the blower ring 3 and internally by the outer surface of the wall of the tube 4 and this retardation gives rise to a pressure drop. Thus, the pressure in the annular gap 16 is reduced relative to that within the tube and the wall of the latter has a tendency to expand outwards as diagrammatically illustrated in the drawing. The reduction in pressure in the gap 16 propagates in a direction opposite to the direction of extrusion of the tube up to the exit plane of the extrusion die 1 so that the tube, right from the commencement of its exit from the die 1 up to leaving the blower ring 3, has a zone of relatively low pressure around its exterior.

The top lip 8 comprises an adjuster ring 17 which is adjustable as an entity in the direction of the blower ring centre axis, in terms of its interval from the bottom lip 7. To this end the adjuster ring 17 is provided for example at its external periphery, at 18, with a screw thread. It will immediately be apparent that by adjusting the ring 17 towards the bottom lip 7, the flow passages 10 are constricted, and conversely, if it is moved away they are opened up. If the throughput of cooling gas through the blower ring 3, remains unchanged, but the passages 10 are constricted by adjusting the ring 17, the gas flow in the flow passages is still further accelerated. This has the effect of decreasing the pressure in the annular gap 16 and increasing the pressure difference between the inside and the outside of the tube 4.

The adjuster ring 17, in the preferred example illustrated, presents a secondary air passage 19 in the form of an annular slot having an exit opening 20 into the annular gap 16 downstream of the plane 9 of the blower orifice. The entry opening 21 to the secondary air passage 19, is located in that end of the blower ring 3 which faces away from the extrusion die 1 that is to say in the front face of the blower ring. The pressure and flow conditions in the annular gap 16 cause outside air to be induced through the secondary air passage 19 into the annular gap 16, from the environment, and this outside or secondary air mixes with the cooling gas in a turbulent manner, finally flowing out of the annular gap 16 in the direction of the arrow shown in the drawing, together with the cooling gas. In order to regulate the secondary air flowing into the annular gap 16, in the example being described the passage 19 is defined between two annular bodies 22, 23 making up the adjuster ring, the inner annular body 22 facing the tubular sheet 4, being adjustable relative to the outer annular body 25 by means of suitable adjuster devices, for example screw adjusters, (not shown), in the direction of the blower ring centre axis 5. Instead of a secondary air passage 19 of annular slot form, it is equally possible to provide a number of secondary air passages distributed around the blower ring opening with precisely similar effect.

The body 22 has an inner frusto-conical wall which diverges in the direction of extrusion from the blower opening. The annular gap 16 which is delimited externally by this wall 24 and internally by the outer wall surface of the tube 4, has a reducing through flow cross-section in the direction away from the exit plane 9 of the blower opening, considered in the direction of extrusion, and the cooling gas or mixture of secondary air and cooling gas, is accelerated as it flows out through the gap 16.

The introduction of secondary air substantially intensifies the rate of cooling of the tube 4, with consequent reduction in the interval of the so-called frost line from the exit plane of extrusion die 1. This makes it possible, whilst maintaining a permissible maximum interval between the frost line on the tube 4 and the exit plane of the die 1, to substantially increase the extrusion speed, especially since at the same time the mechanical stresses applied to the tube in the plastic zone thereof are reduced, and not least because flutter phenomena and consequent fouling of the blower ring by the tube, are avoided; in this way, the extrusion speed can be increased without impairing the uniformity and quality of the tube.

I claim:

1. In a device for extruding synthetic material, said device having an extrusion die with an extrusion orifice, and means to supply the die with plastic material under extruding pressure, the improvement which comprises a blower ring surrounding the extrusion die, said blower ring having a conical inner wall which expands in a downstream direction, said blower ring blowing gas upon the extruded material coming out of the die orifice, means to supply the blower ring with cool gas under pressure, the inner wall of the blower ring having a ring slit forming an aperture directing the cool gas stream approximately in a downstream direction along the axis of the extruded material, the blower ring having a ring opening downstream of and near the ring slit, a channel with adjustable cross-section for conducting a cool gas stream to the ring opening, the flow of pressure gas through the ring slit inducing the flow of ambient air through the ring opening adjacent thereto and thus in through said channel.

2. A device according to claim 1, wherein the ring opening for the introduction of ambient air through the channel is provided with an entrance opening in its downstream side, the supply of cool gas being connected to the blow ring at its upstream side.

3. A device according to claim 1, wherein the blower ring is provided with a downstream and an upstream lip the spacing of which is changeable by an adjustment ring whereby to vary the ring-formed openings for the cool gas stream.

4. A device according to claim 3, wherein the downstream lip of the adjustment ring comprises two radially spaced ring bodies which form said channel between them, the inner ring body facing the extruded material being adjustable relative to the outer ring body along the axis of the blow ring.

5. A device in accordance with claim 1, wherein the ring bodies are disposed coaxial, and the channel formed therebetween is of annular cross-section.

* * * * *